United States Patent [19]

Hoffman

[11] Patent Number: 5,529,357
[45] Date of Patent: Jun. 25, 1996

[54] LEVERAGE ENHANCING ASSEMBLY

[75] Inventor: Ned Hoffman, Berkeley, Calif.

[73] Assignee: Omnilock, Inc., Berkeley, Calif.

[21] Appl. No.: 299,502

[22] Filed: Sep. 1, 1994

[51] Int. Cl.⁶ .............................. A01B 1/22; B25G 3/20
[52] U.S. Cl. .............................. 294/58; 15/145; 16/114 R
[58] Field of Search .................... 294/1.1, 19.1, 294/25, 26, 50.8, 57–59; 15/143.1, 145; 16/110 R, 111 R, 113, 114 R, 115, DIG. 25; 30/298, 323, 327; 43/21.2, 23, 25; 56/400.01, 400.04, 400.05; 74/551.8, 551.9; 135/71–73, 76; 172/371, 375; 224/218, 219, 222

[56] References Cited

U.S. PATENT DOCUMENTS

| | | | |
|---|---|---|---|
| 309,437 | 12/1884 | Calef | 294/58 X |
| 407,571 | 7/1889 | Calef | 294/26 X |
| 712,843 | 11/1902 | Paul | 294/58 X |
| 1,086,636 | 2/1914 | Anderson | 294/26 |
| 2,482,589 | 9/1949 | Maguire | 294/58 X |
| 2,516,852 | 8/1950 | Burry et al. | 135/71 |
| 3,372,509 | 3/1968 | Arsenault | 294/58 X |
| 3,372,510 | 3/1968 | Arsenault | 294/58 X |
| 4,196,742 | 4/1980 | Owen | 135/71 |
| 4,477,114 | 10/1984 | Callis | 294/58 X |
| 4,644,740 | 2/1987 | Lee | 56/400.04 |
| 4,822,087 | 4/1989 | DeCarlo | 294/58 X |
| 4,888,846 | 12/1989 | Natale | 294/58 X |
| 5,123,137 | 6/1992 | McCauley | 15/143.1 X |
| 5,159,775 | 11/1992 | Sutula | 294/58 X |

FOREIGN PATENT DOCUMENTS

| | | | |
|---|---|---|---|
| 3517538A | 11/1986 | Germany | |
| 2183433 | 6/1987 | United Kingdom | 294/58 |
| 2248034 | 3/1992 | United Kingdom | 294/58 |

Primary Examiner—Johnny D. Cherry
Attorney, Agent, or Firm—Ali Kamarei

[57] ABSTRACT

A full motion leverage enhancing assembly is provided for attachment to the handle of a mop, broom, rake or similar tool which has an elongate handle and a center of gravity strongly skewed away from the grip point utilized by the tool operator. In this embodiment, the leverage enhancing assembly comprises an arm clamp for securing the tool handle to a single arm of the user and a grasping shaft for grasping the tool handle. The arm clamp is comprised of a first rigid longitudinal segment adjustably attached to the end of the tool handle proximate to the user by a semi-rigid clamp having an adjustable circumference. The arm clamp is further provided with a pair of flexible, adjustably interlocking straps extending from the proximal end of the longitudinal segment opposite the clamp. The straps are constituted to form a semi-permanently and adjustably substantially circular clasp for receiving and securing a portion of the user's forearm. The grasping shaft comprises a second rigid longitudinal segment attache to the tool handle by a semi-rigid clamp opposite the user relative to the arm clamp and in axial alignment with the arm clamp. This second longitudinal segment is furthered configured to be adjustably matable to the first longitudinal segment. The grasping shaft is substantially perpendicularly protruding from the second longitudinal segment and has an abutment flange for increasing the stability of the user's grip on the grasping shaft.

18 Claims, 11 Drawing Sheets

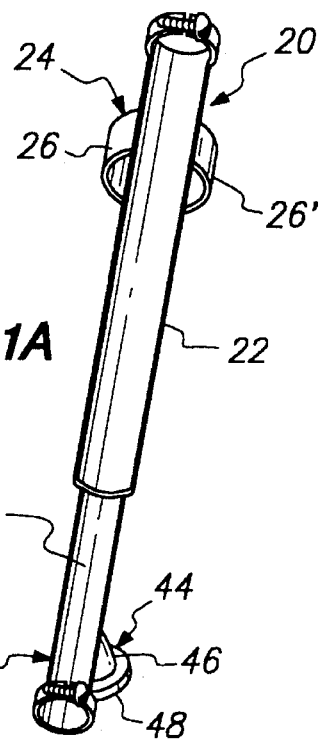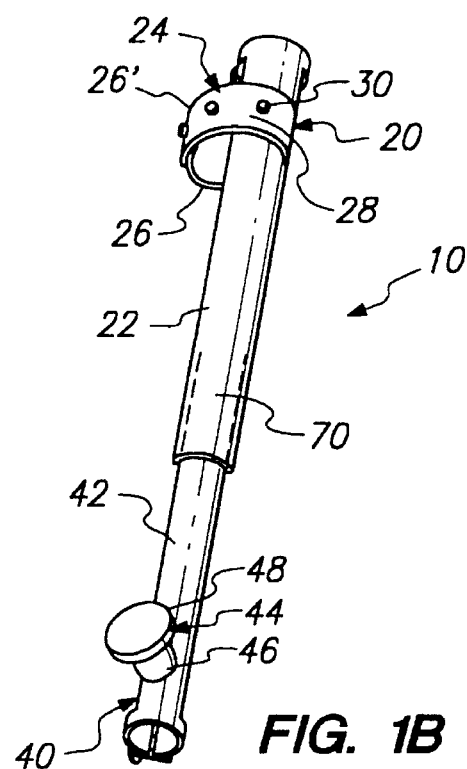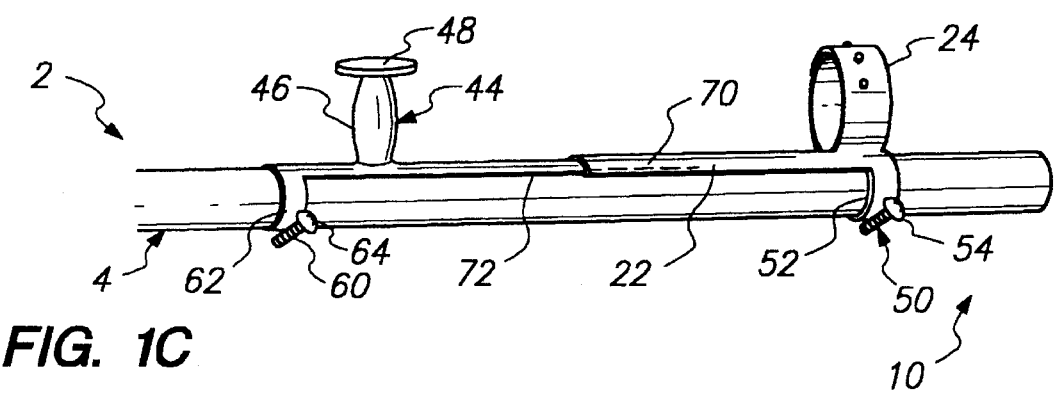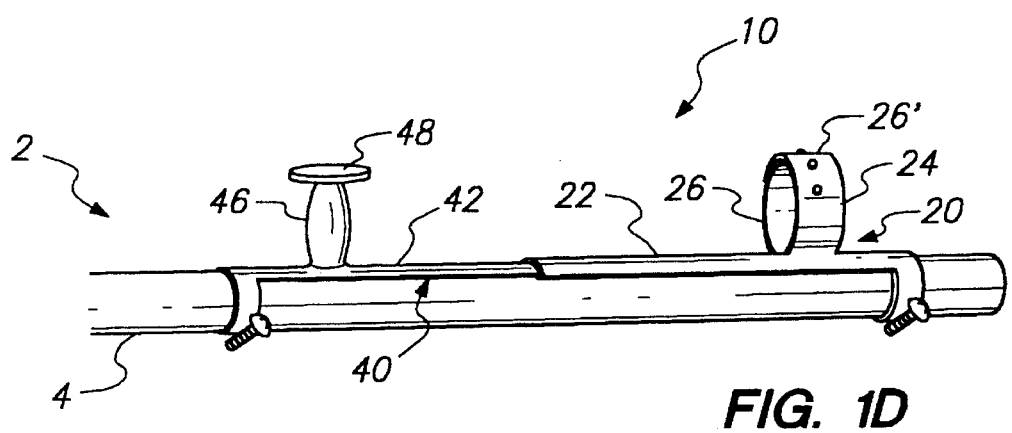

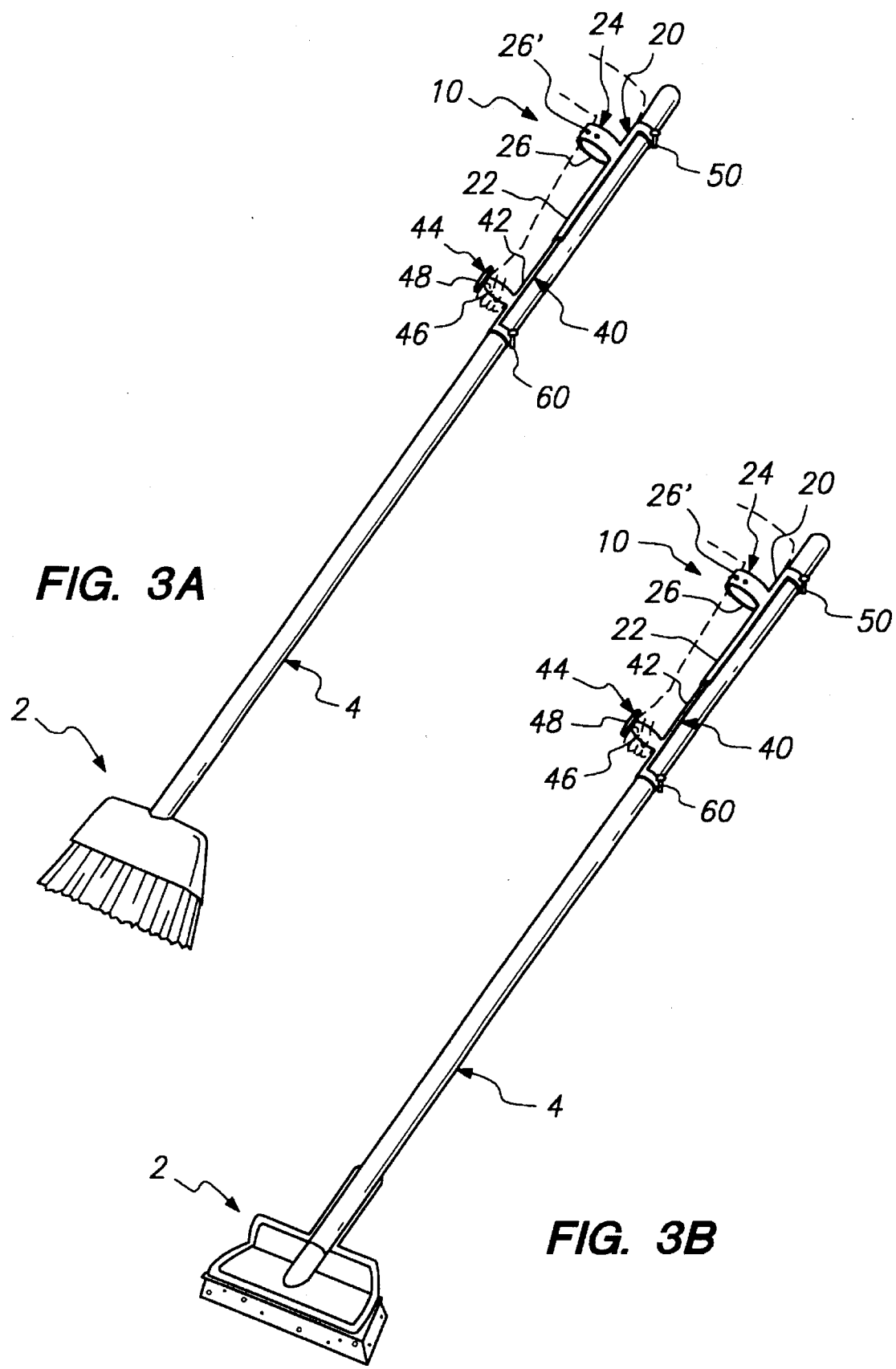

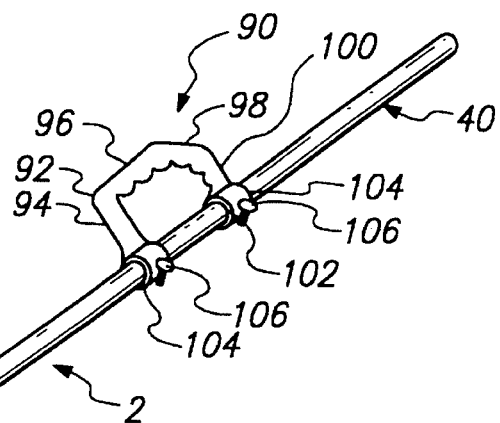
FIG. 9A
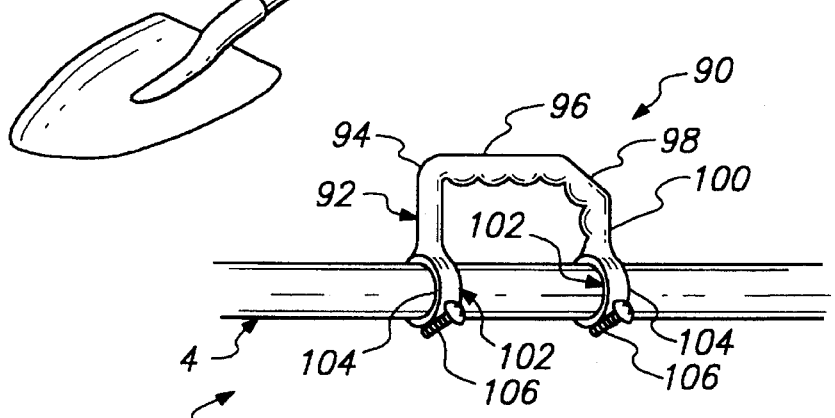
FIG. 9B
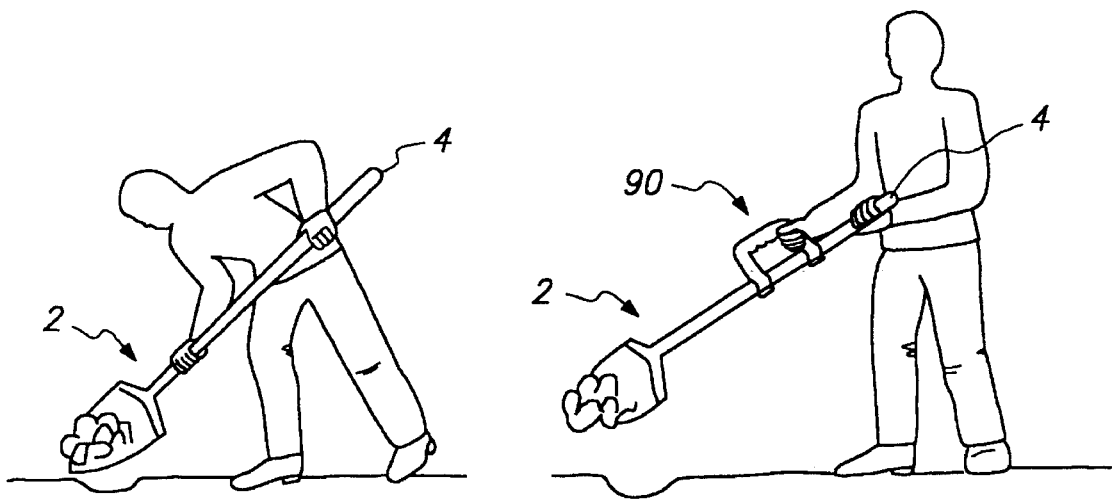
PRIOR ART
FIG. 9C
FIG. 9D

LEVERAGE ENHANCING ASSEMBLY

FIELD OF THE INVENTION

The invention relates generally to tools and other implements that generally require use of both of a user's hands and arms to operate, and more particularly, to the modification of such tools to enhance a user's ability to leverage the tool or implement throughout a full range of motions, and thereby increase the stability and control of the tool during use and decrease the amount of muscular exertion required by the user.

BACKGROUND OF THE INVENTION

At one time or another, everyone has used a tool such as a mop, broom, rake, shovel or the like that requires the use of both hands and arms, as well as upper body muscles, for successful utilization. Tools requiring two-handed use share several characteristics. First, they are generally surmounted by an extended pole or shaft by which the tool is gripped and manipulated. These instruments also exhibit a center of gravity that is skewed (relative to the tool's geometric center) strongly toward the distal end of the tool and away from the end gripped by the user. Finally, these tools must be manipulated fully throughout three dimensions in order to operate them successfully and efficiently. This final point cannot be over-emphasized. For while in operation the tool may move predominantly in one or a few directions, the user must nevertheless be able to leverage the tool throughout three dimensions without undesirable tiring, muscle strain or loss of control. To accomplish this currently requires the use of two hands and arms to leverage such tools. However, this solution is not desirable as it obligates the user to exert and stress most upper body muscles, particularly muscles of the shoulders, arms and stomach. Further, the leverage problem is exacerbated if the tool is particularly long-handled or is connected to an extension, either of which operates to displace the tool's center of gravity further from the user, making the tool even more unwieldy.

Unfortunately, human anatomy does not lend itself well to the leveraging of brooms, rakes and other such tools for extended periods of time. In order to leverage the tool sufficiently to achieve satisfactory results, one must not only bend, but decidedly twist, one's back. The repeated stooping and torquing of the bones and muscles of the back, neck and shoulders frequently lead to muscle cramping and may ultimately aggravate arthritic conditions and adversely affect the geometry of the spinal column leading to ruptured disks, scoliosis and other pathologies.

Such neck, back and shoulder exertion is unfortunately required if the tool is to be operated in a satisfactory fashion. Because both the center of gravity and the operational end of the tool are distant from the user, great force and precise control by the user are required in order to manipulate the tool through a desired three dimensional range of motions at a precise and desired force.

Workers have, with little success, attempted to overcome these inherent difficulties by redesigning such tools. Generally speaking, these redesign efforts address the issue of leverage and tool control with respect to one type of motion, generally the direction of motion through which the tool is routinely and repetitively moved. However, all such tools actually require manipulation throughout the full range of possible movement. Thus, prior art improvements, such as those described in more detail below, neither contemplate nor solve the problems overcome by the present invention.

Typical examples of such prior art include U.S. Pat. No. 4,822,087 to DeCarlo and U.S. Pat. No. 5,159,775 to Sutula, Jr.

DeCarlo discloses a modified fishing net. The handle of the fishing net is provided with a hand grip and an elbow support. Unlike the present invention, DeCarlo is directed to improving stability and maneuverability of the net in a vertical direction, hence his characterization of the invention as a "lift improvement device." Further, the modifications taught by DeCarlo are designed to increase stability of a device that is already predominantly operated using one hand.

Sutula, Jr. discloses a modified fishing rod. The rod is provided with non-adjustable forearm grips to help stabilize the vertical movement of the fishing rod relative to the forearm. As with DeCarlo, Sutula, Jr. teaches the modification of a tool that is already operated successfully with one arm. Further, as with DeCarlo, the movement that is improved and stabilized is limited to vertical movement.

Improvement of stability and maneuverability throughout a three dimensional range of motion is neither contemplated nor taught by the prior art. Further, the prior art neither contemplates nor teaches an improvement which alleviates the need for tightly grasping a tool with the small muscles of the hand and wrist. Thus, there is a need for an improvement in existing tools requiring two-handed operation, such as brooms, rakes, shovels and the like, that significantly increases leveraging and minimizes the use of hand and wrist muscles, thereby increasing tool stability and control, throughout a full, three-dimensional range of motion. Such an improvement may be integral with the tool, or may be designed as a retrofit to be added to existing tools.

There is also a need for an apparatus that increases the leveraging power and maneuverability of tools generally, thereby reducing back strain and overall muscular exertion of the user while increasing tool control and effectiveness.

There is also a great need for a leveraging apparatus that is fully customizable to adapt quickly and precisely to the dimensions of the particular user's arm in conjunction with a particular tool.

SUMMARY OF THE INVENTION

It is an object of the present invention to provide an assembly that allows a user to enhance leverage in all three dimensions, and thereby enhance control and operability of a tool throughout the full range of possible motions.

It is another object of the invention to allow the user of a long handled tool with a center of gravity skewed away from the user, such as a mop, broom or rake, to provide a leveraging apparatus to allow the user to operate the tool successfully using only a single arm and hand.

Yet another object of the invention to provide such a leveraging apparatus that can be customized to the dimensions and proportions of a user's arm.

A further object of the invention is to provide an assembly that is lightweight and inexpensive to manufacture.

Another object of the invention is to provide a grasping shaft abutment surface which enables the user to minimize muscular exertion by shifting stress from the small muscles of the hand, wrist and forearm to the large muscle groups of the upper arm and torso.

Yet another object of the invention is to provide such retrofit with a clamping system that prevents the leveraging assembly from twisting, moving or otherwise coming loose relative to the tool handle as various stresses are applied to the leveraging assembly during use.

Still another object of the invention is to provide a retrofit apparatus that is universally adaptable both to the dimensions of the arm of a given user and also to the dimensions of the handle of the desired tool.

Another object of the invention is to provide a leveraging grip that can be formed integral with or added as a retrofit to an existing shovel, said leveraging grip allowing the user to grasp and operate the shovel with both hands and arms such that the user is enabled to maintain a substantially upright posture.

A further object of the invention is to provide a leveraging assembly integral with or as a retrofit upon the back of a hand brush, trowel, sanding block or similar tool.

A general and central object of all embodiments of the invention is to provide a leveraging means that significantly stabilizes the operation of a tool relative to the center of gravity of the tool, thereby reducing the total number of user muscle groups and the total amount of user muscle exertion needed to operate a tool successfully throughout three dimensions for protracted periods.

The present invention meets these objects and overcomes the shortcomings of the prior art by providing inexpensive, easy to use leveraging apparatus that can be retrofitted on existing tools, or that can be formed integral with the tool.

According to one embodiment, a full motion leverage enhancing assembly is provided for attachment to the handle of a mop, broom, rake or similar tool which has an elongate handle and a center of gravity significantly skewed away from the grip point utilized by the tool operator. In this embodiment, the leverage enhancing assembly comprises a means for securing the tool handle to a single arm of the user and a means for grasping the tool handle with minimal muscular exertion. The securing means is comprised of a first rigid longitudinal segment adjustably attached to the end of the tool handle proximal to the user by means of a semi-rigid clamp having an adjustable circumference means. The arm securing means is further provided with a pair of flexible, adjustably interlocking straps extending opposite the clamp from the proximal end of said longitudinal segment. The arm securing means is further provided with a hole and peg system for adjustable mating, wherein the hole and peg system further comprises a series of holes provided lengthwise along one of the straps and a peg provided lengthwise along the other strap, the peg configured to snugly mate with the holes. The straps are constituted to form a semi-permanently, adjustably and substantially circular clasp for receiving and securing a portion of the user's forearm. The grasping means comprises a second rigid longitudinal segment attached to the tool handle by means of a semi-rigid clamp opposite the user relative to said arm securing means and in axial alignment with said arm securing means. This second longitudinal segment is further configured to be adjustably matable to said first longitudinal segment and is at its distal end provided with a substantially perpendicularly and apically flared protruding grasping shaft having an abutment flange. Each longitudinal section is axially convexly configured, each segment being substantially similar in arc to that of the other segment. Furthermore, the segments are of substantially the same length. The abutment flange may be terminal on the grasping shaft and projects outward substantially perpendicular of the grasping shaft and substantially parallel to the second longitudinal section, or somewhat displaced from the apex of the shaft, and is designed to minimize muscular exertion by shifting stress from the small muscles of the hand, wrist and forearm to the large muscles groups of the upper arm and torso. The flange also virtually eliminates the risk of the hand sliding off the grasping shaft, which could result in injury to the user of the leveraging apparatus.

According to another embodiment of the invention, a full motion leverage enhancing grip for attachment to a handle of shovel or similar tool is disclosed. One significant advantage of this embodiment is to permit the user to maintain a substantially erect posture while using the device. By thus avoiding stooping, the user minimizes strain and discomfort to the back and shoulder muscles. The current embodiment of the invention accomplishes this by elevating the user's second hand, displacing it away from the tool handle in a vertically more elevated position, thereby avoiding the need for the user to bend over. The leverage enhancing grip comprises a more or less v-shaped to u-shaped rod having at least one substantially linear segment for gripping by the user. This segment lies in the same plane as the tool handle and is positioned to intersect with the tool handle, either directly or by extension, to form an included angle of about 45 degrees. In one embodiment, the grip comprises more particularly a u-shaped, three-angled rod having a first, second, third and fourth segments arrayed within a single plane. The first and second segments are joined to form an included angle of substantially 90 degrees. The second and third segments, as well as the third and fourth segments, are joined to form an included angle of approximately 135 degrees. In addition, the leveraging grip may be provided with adjustment means for elongating the grip relative to the tool handle. This accommodates various user heights such that a user of a greater height may reach the grip with minimal displacement of back posture. The leveraging grip further comprises a first and a second clamping means for mating said grip to the handle of the shovel at a selected position.

According to yet another embodiment of the invention is provided, a leveraging assembly for a brush or similar hand tool requiring repetitive motion in a plane and full dimensional manipulation. This leveraging assembly utilizes some of the same elements already described for mops, brooms, rakes and similar tools. This assembly provides a securing means on the back of the brush for securing the wrist of a user, and a grasping means having a grasping shaft extending from the back of the brush in a more or less perpendicular fashion. The grasping shaft is further provided with an abutment flange at or towards its apex that acts as a grip abutment to prevent inadvertent slippage of the hand from the grip during use of the brush, thereby increasing stability and minimizing the user's muscular exertion.

Other objects, advantages and applicability of the invention will become apparent upon consideration of the drawings and detailed description of the invention that follows below.

BRIEF DESCRIPTION OF THE DRAWINGS

FIG. 1A is a bottom view of one embodiment of the leveraging assembly of the invention. FIG. 1B is a top view of the embodiment shown in FIG. 1A. FIG. 1C and 1D are side views of the embodiment of FIG. 1A attached to the handle of a mop, broom or similar tool.

FIG. 3A is a view in perspective of the embodiment of the assembly of FIG. 1 as used on a broom. FIG. 3B is a view in perspective of the embodiment of the assembly of FIG. 1 as used on a mop.

FIG. 9A is a view in perspective of an assembling of the non-adjustable embodiment of the leveraging grip of the invention with a shovel. FIG. 9B is a close-up view in perspective of the leveraging grip as attached to the shovel handle. FIG. 9C shows a user of stooped posture wielding a standard shovel without the leveraging benefit of the grip of the invention. FIG. 9D shows a user of substantially erect posture wielding an assembly of a shovel with the leveraging grip of the invention.

FIG. 11D is a view in perspective of another embodiment of the leveraging assembly of the invention in conjunction with a block sander or a stripper.

FIG. 12 is a view in perspective of an assembling of an embodiment of the leveraging grip of the invention attached to the handle of a hand trowel.

DETAILED DESCRIPTION OF THE INVENTION

Leverage-Enhancing Assembly for Long-Handled Tools

Figure 2A:
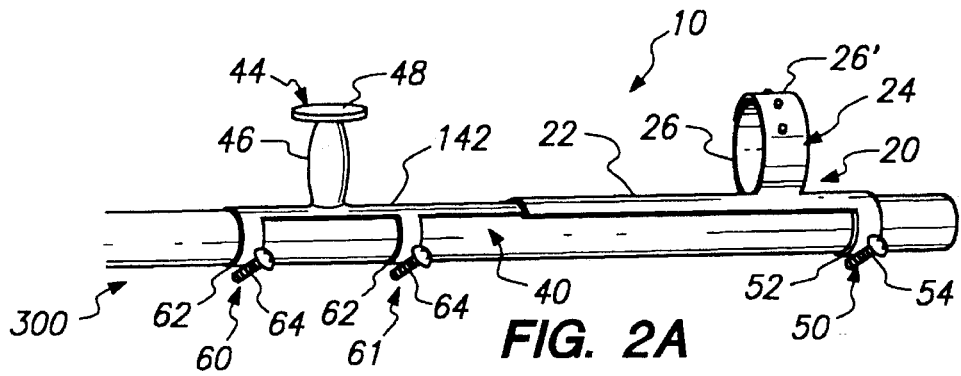
FIG. 2A–E is a view in perspective of the leveraging assembly of the invention provided with different means for clamping the assembly to the tool handle.
Figure 2B:
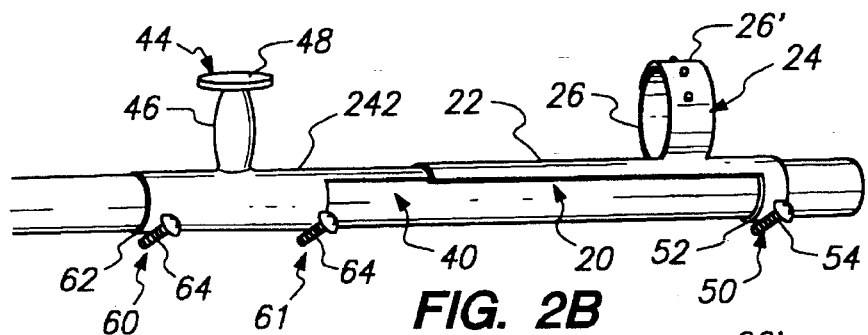
Figure 2C:
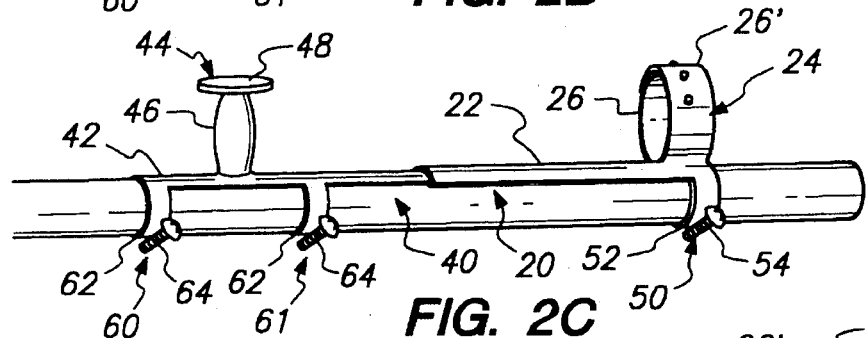
Figure 2D:
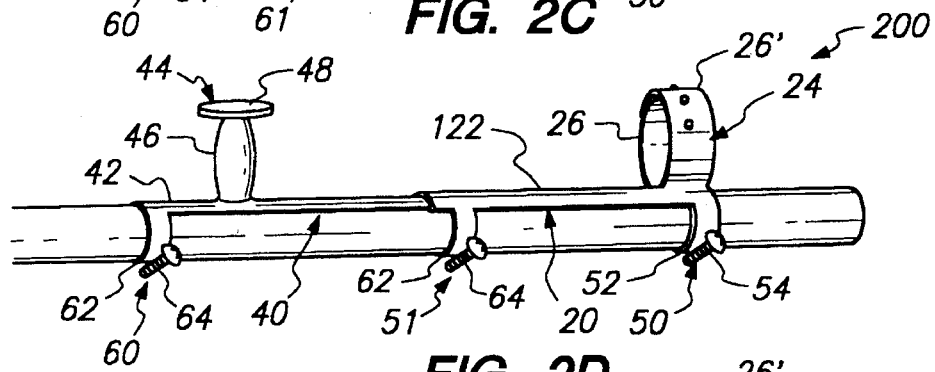
Figure 2E:
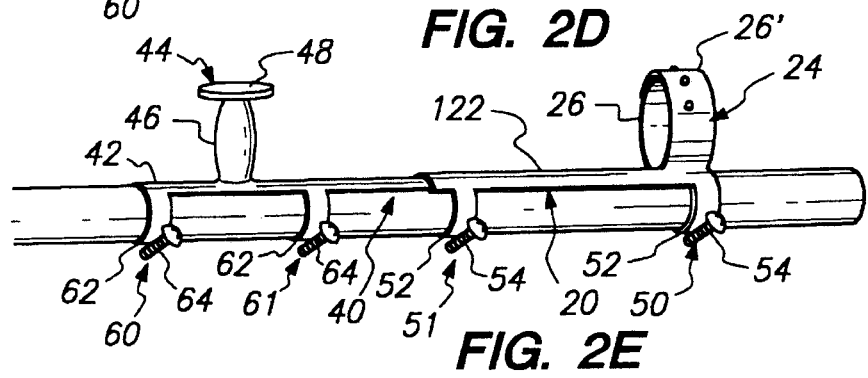

Turning now to the Figures, certain embodiments of the present invention will now be described. FIG. 1 is a view of a first embodiment of the leverage enhancing assembly 10 of the invention. In this embodiment, a two-member assembly for retrofit to the handle of an existing tool, such as a broom or rake, is provided.

The first member 20 is provided with a longitudinal segment 22 for-mating to the handle 4 of tool 2 and for coupling with the second member 40 of leverage enhancing assembly 10. The first member 20 is also provided with a forearm securing means 24.

Figure 4A:
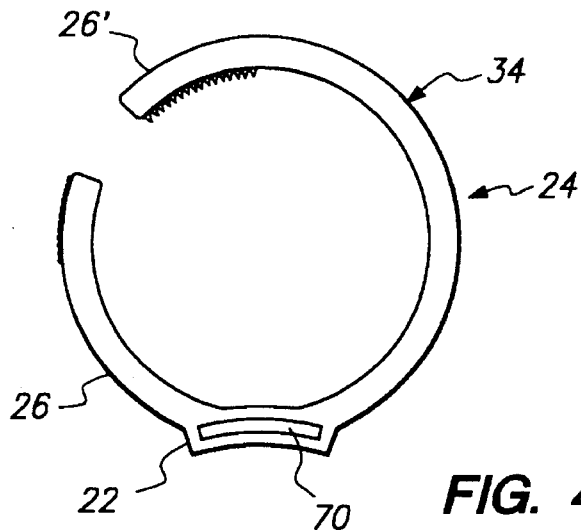
FIG. 4A is a cross-sectional view of the forearm clasping means of the invention as provided with a hook and loop Velcro® means of attachment.
Figure 4B:
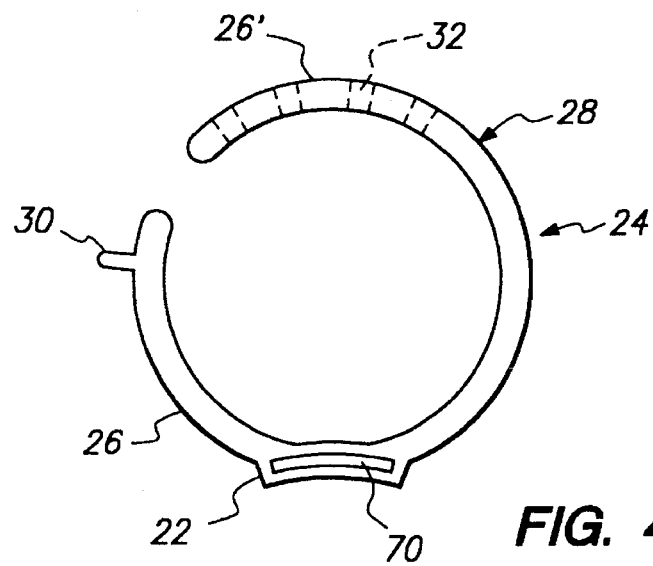
FIG. 4B is a cross-sectional view of the forearm clasping means of the invention as provided with a peg and hole fastening system. It will be appreciated that other applicable securing means are envisioned.
Figure 4C:
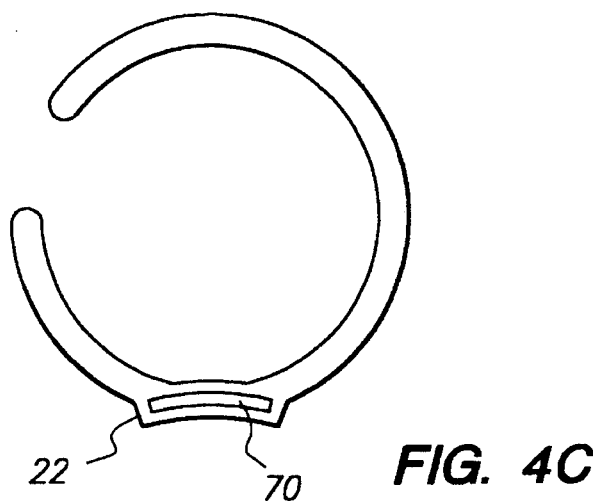
FIG. 4C shows a cross-sectional view of the forearm clasping means without a fastening system.
Figure 5A:
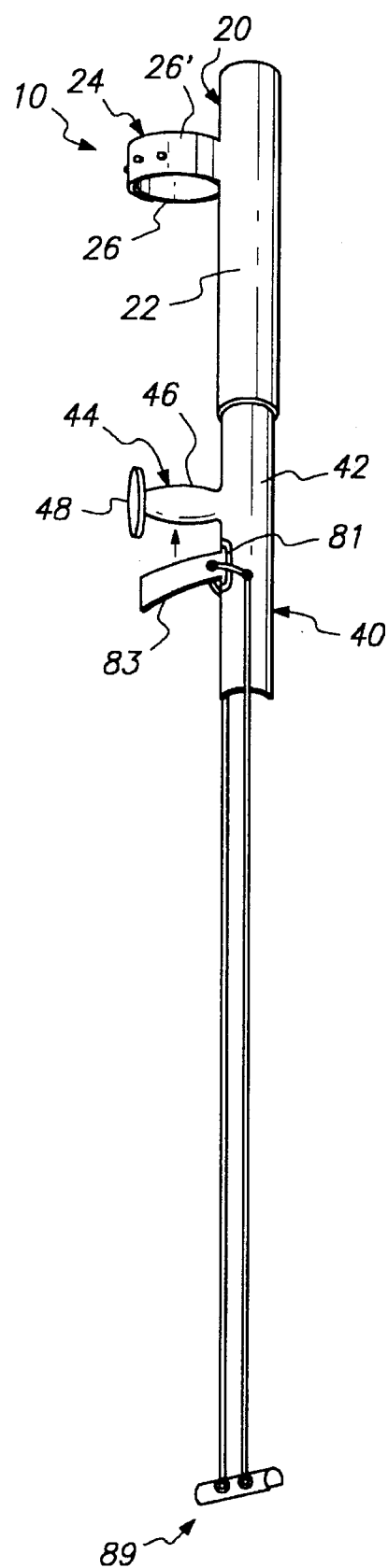
FIG. 5A is a side view of the leveraging assembly of the invention as utilized with a mop having a mechanical wringing system.
Figure 5B:
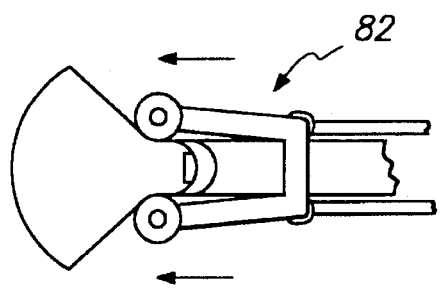
FIG. 5B is a side view of a first embodiment of a mechanical wringing system.
Figure 5C:
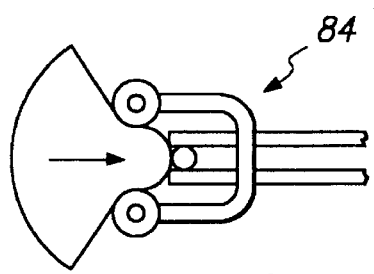
FIG. 5C is a side view of a second embodiment of a mechanical wringing system.
Figure 5D:
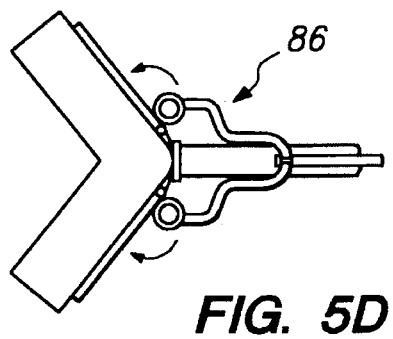
FIG. 5D is a side view of a third embodiment of a mechanical wringing system.

This forearm securing means 24 is further provided with a pair of flexible straps 26 and 26'. These straps 26 and 26' are designed to receive, wrap around and secure a portion of the forearm of the user. It is important to understand that the grip is adjustable to the circumference of the user's forearm by use of various adjustably securing means. The straps may be secured in incremental adjustments by means of a peg and hole fastening system 28 as shown in FIG. 4B. It will be appreciated that a desired circumference of forearm securing means 24 can be accomplished by inserting peg 30 in the desired hole 32. A fully adjustable, non-incremental means of affixing straps 26 and 26' to one-*another can be accomplished using a Velcro ® hook and loop fastening system 34 as shown in FIG. 4A.

Second member 40 is also provided with a longitudinal segment 42 for coupling to the handle 4 of the tool 2, and for mating with longitudinal section 22 of first member 20. Second member 40 is further provided with grasping means 44 having a grasping shaft 46. The grasping shaft 46 is design to be held within the palm of the hand of the user. Grasping shaft 46 is further provided with an abutment flange 48. The abutment flange 48 is designed to prevent the user from losing control of the grasping shaft 46, particularly as force is applied to the tool 2 in such a way as to cause the hand to slide axially along the long axis of the grasping shaft 46.

The first and second members 20 and 40 can be fabricated of any suitable material that is strong, resilient, and generally impervious to the corrosive or abrading agents that may be from time to time used with a particular tool. From a standpoint of cost and efficiency, it is preferred to fabricate the units from injection-molded polymer plastic, thus providing a minimum number of individual parts to be shaped and attached to the tool.

It will also be appreciated that the unit just described can be manufactured either as a retrofit for existing tools, or can be provided as integral with a new tool at point of sale. It is useful to maintain the separable nature of the leverage enhancing assembly 10, because this allows for a significant degree of cost efficiency and ease of adjustability to fit the arm of a user as described in greater detail below.

In operation, the first member 20 is affixed to the end of the tool handle 4 proximate to the user as shown in FIG. 3. Member 20 is affixed by a clamp means 50. The Clamp means 50 comprises a more or less circular loop 52 joined by a clamping screw 54. As the screw 54 is loosened, the circumference of the loop 52 is increased. Conversely, as the screw 54 is tightened, the circumference of the loop is shortened. In this way, the loop can be made to mate with and securing affix to the handle of any existing tool. In practice, the handle diameters of such tools range between ½ and 1½ inches in diameter, although it will be appreciated that the clamping means described herein could be utilized to clamp the leverage enhancing means to a handle of virtually any diameter. The clamp means 50 is generally positioned opposite the forearm restraining means 24. A leverage assembly 200 with further clamp means 51 may be further affixed to the first longitudinal section at its distal end, as shown in FIG. 2. This additional clamping means increases the stability of the attachment of the longitudinal section 122 of first member 20, preventing the segment from arching or bowing away from the tool handle under stress.

Similarly, the second member 40 is affixed medially to the handle of the tool at a point opposite the user relative to the attachment point of the first member 20. Attachment of the second member 40 is accomplished similarly to that just described for the first member, by means of a clamping means 60 provided with a circular loop 62 and a clamping screw 64. The clamping means 60 is positioned nearly opposite the grasping means 44 relative to the tool handle. Further, a leverage assembly 300, with an additional clamping means 61, as shown in FIG. 2, is additionally provided in order to increase the stability of attachment of the longitudinal sections 142 or 242 of second member 40. One will note that when two clamping means are used, they are positioned underneath and slightly displaced to either side of the grasping means 44, as shown in FIG. 2, in order to prevent the second longitudinal segment from arching or bowing away from the tool handle as pressure is exerted on the grasping means 44.

Figure 8A:
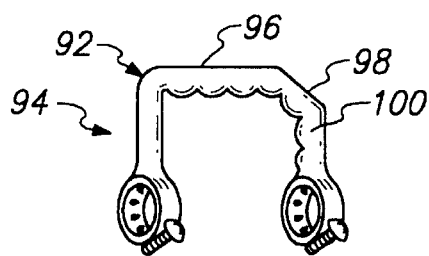
FIG. 8A–C are respectively a view in perspective, a side and an end view of a first embodiment of the leveraging grip of the invention.
Figure 8B:
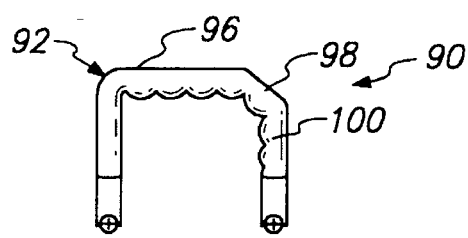
Figure 8J:
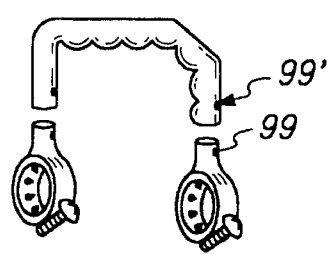
FIG. 8J is a side view of a first embodiment of the leveraging grip.
Figure 8C:
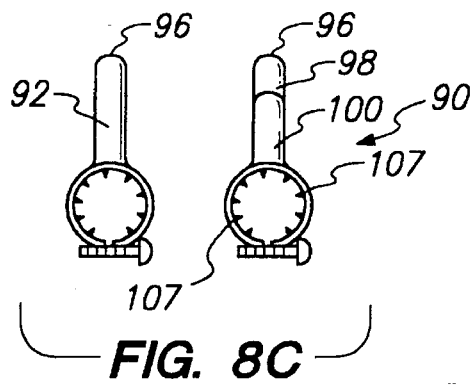
Figure 8D:
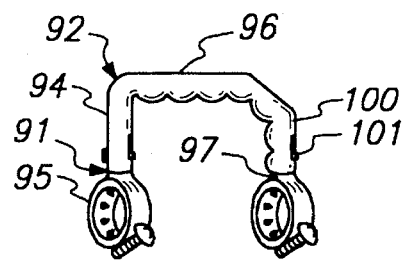
FIGS. 8D–G are perspective and side views of the leveraging grip of the invention as provided with adjustment means.
Figure 8E:
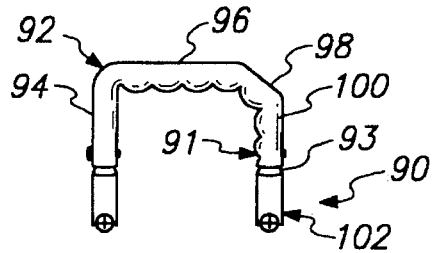
Figure 8F:
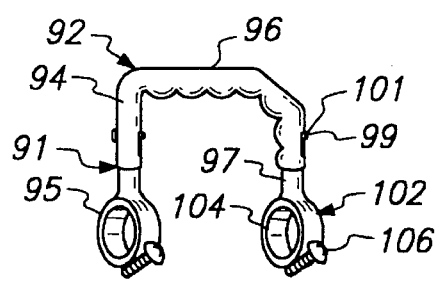
Figure 8G:
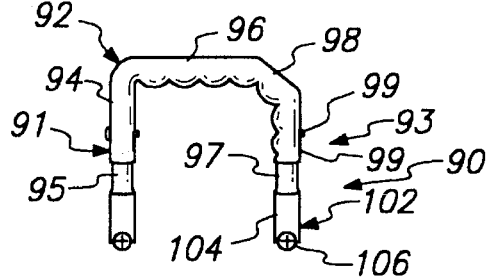
Figure 8H:
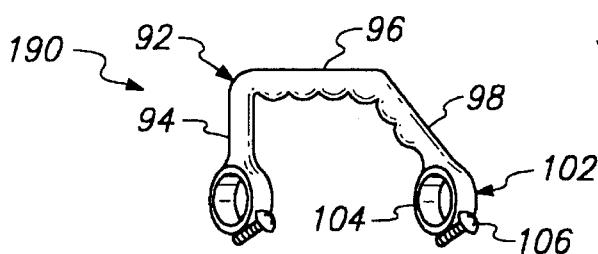
FIGS. 8H–I are perspective and side views of another embodiment of the leveraging grip of the assembly.
Figure 8I:
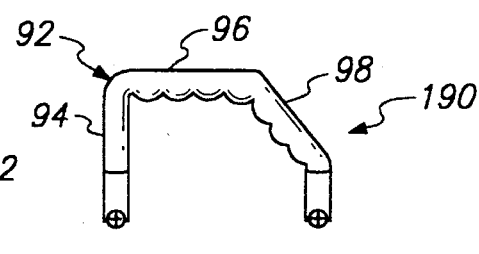

In both clamping means 50 and 60, the circular loops 52 and 62 can be provided with ridges, bumps or some other sort of textured raised surface, as shown in FIG. 8C, in order to increase frictional contact between the clamping means and the surface of the tool handle.

Engagement and affixation of the leverage enhancing means to the tool handle is further accomplished by configuring the longitudinal segments 22 and 42 of first and second members 20 and 40 to be interlocking with one another. One straightforward and elegant means of accomplishing this end is to provide the first member 20 with a longitudinal channel 70. The end 72 of longitudinal segment 42 of second member 40 is then configured for snug and slidable receipt within channel 70 of longitudinal segment 22 of first member 20.

In operation, the first and second members 20 and 40 are coupled to one another so that the distance between the forearm clamping means 24 and the grasping means 44 is customized to approximately the distance between the elbow and the wrist of the user, so that the grasping means can be comfortably grasped in a resting position once the arm is inserted into and coupled with the forearm securing means 24. Once this particular length is ascertained, the leverage enhancing assembly is attached to the handle 4 of tool 2 by means of the clamps described above. The arm is then inserted into the forearm securing means 24 and the flexible straps 26 and 26' are then wrapped around the arm tightly enough to secure a portion of the forearm to the handle 4 of tool 2 without unnecessary cutting into the flesh of the arm or retarding circulation within the arm. Next, the user grasps the grasping means 44 within the palm of the hand and the tool is ready to be manipulated.

As will be understood by one skilled in art, upon reading this description, the assembly just described affords the user with significant leveraging and thus control and ease of manipulation throughout a full range of motions of the tools. Thus lateral, diagonal, vertical, circular and all other motions are more fully controlled. Frequently, this control allows the tool to be effectively and conveniently used with only one arm and hand, whereas without the leveraging device, two hands and arms would be required.

It will also be understood by one skilled in the art that the increase in control and maneuverability allow the user to operate the tool while maintaining a more upright posture and requires less twisting and torquing of the neck, back and shoulder joints. Further, this results in the use of fewer muscle groups, and less exertion of the few muscle groups actually required to operate the tool. Thus, a user will be able to perform a task with significantly better control over significantly longer periods of time than would otherwise be possible with standard prior art. Further, users with less strength and coordination will find that they are better able to achieve superior results in significantly less time with a tool equipped with this leverage enhancing assembly, than would be possible with a standard prior art tool.

Figure 6A:
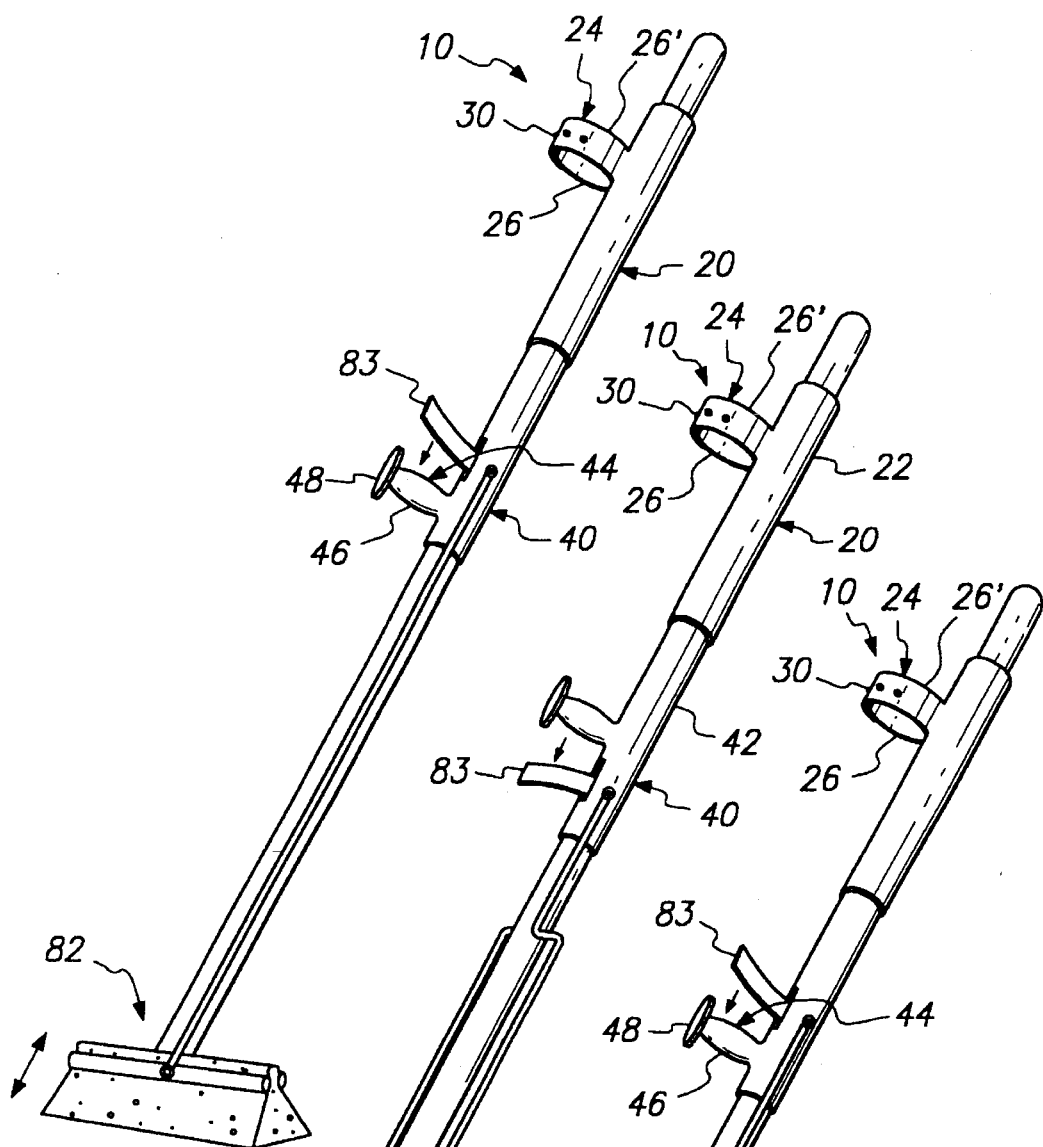
FIG. 6A is a view in perspective of the leveraging apparatus as used with the wringing mechanism shown in FIG. 5B.
Figure 6B:
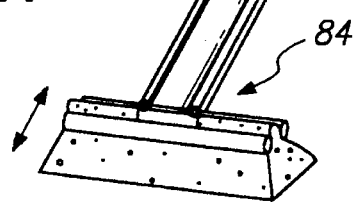
FIG. 6B is a view in perspective of the leveraging apparatus as used with the wringing mechanism shown in FIG. 5C.
Figure 6C:
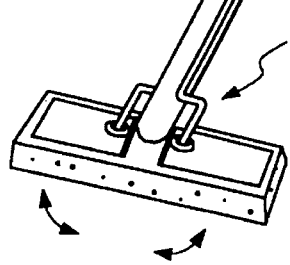
FIG. 6C is a view in perspective of the leveraging apparatus as used with the wringing mechanism shown in FIG. 6D.
Figure 7B:
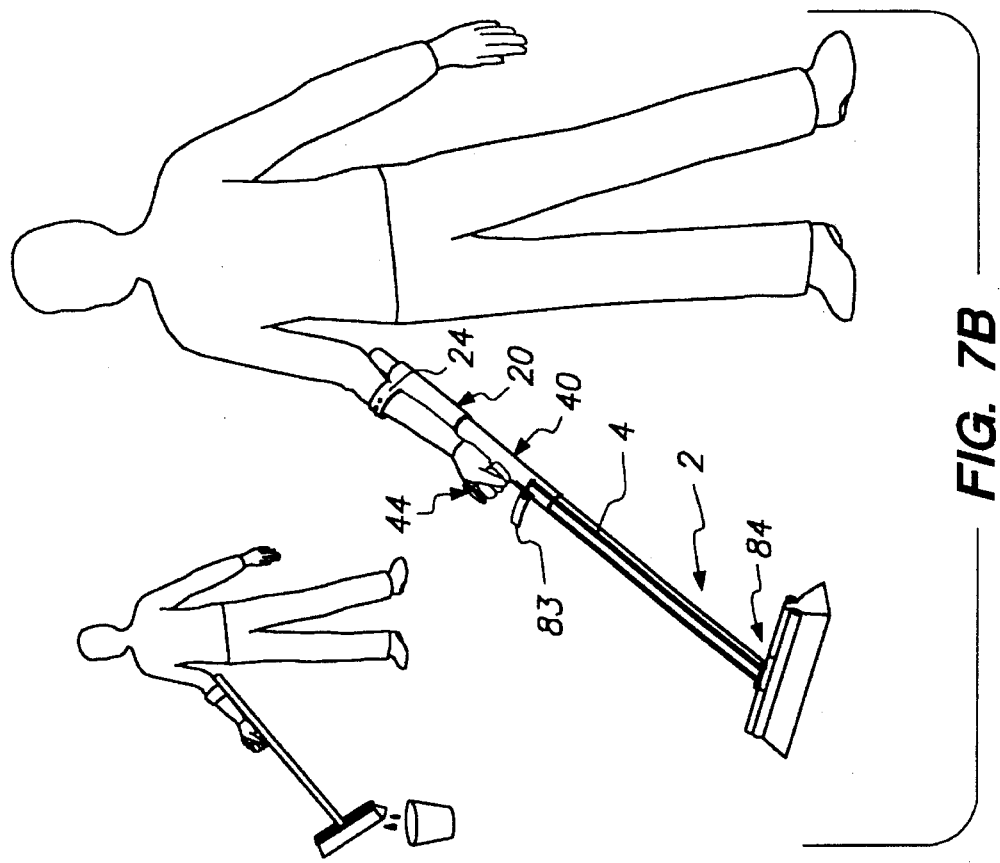
FIG. 7B is a view in perspective of a user having a substantially erect posture operating an assembly of the leveraging device of the present invention and a mop having an automatic wringing mechanism.
Figure 7A:
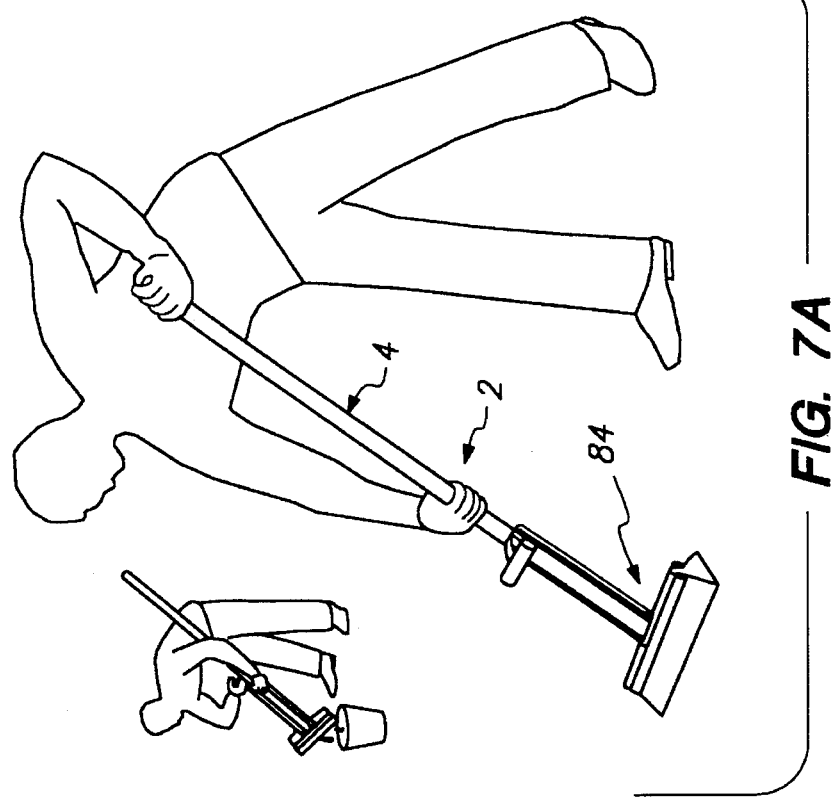
FIG. 7A is a view in perspective of a user with a stooped posture operating a prior art mop with a mechanical wringing system.

As shown in FIGS. 5–7, the leverage enhancing assembly 10 of the invention can also be accommodated for use with a mop having a mechanical wringing mechanism 89. Three different types of wringing mechanism, 82, 84 and 86 are illustrated respectively in FIG. 5B–D and FIG. 6A–C. However, for the purposes of the invention, these mechanisms are interchangeable.

In this instance, the longitudinal segments 22 and 42 are configured to be cylinders, with the second longitudinal segment configured to be slidably and snugly received within the first longitudinal segment. It will also be appreciated from examination of the figures that the second longitudinal segment 42 is provided with a through hole 81 through which the clasp 83 of the mechanical wringing mechanism 80 extends. The clasp 83 may be positioned either distal or proximal to the user relative to the grasping means 44. In this way, one may not only operate the mop with increased leverage and control, but can also operate the mechanical wringing mechanism without resort to two hands and arms and without need for stooping, as shown in FIG. 7.

Leveraging Grip for Shovels and Similar Tools

Turning now to FIGS. 8–9, the leveraging grip 90 and 190 of the invention will now be described. In general, the leveraging grip may be comprised of a substantially u- to substantially v-shaped bar provided with a substantially linear segment for gripping by the user. This segment extends distally outward relative to the tool handle, and either connects with or can be extended hypothetically to intersect the tool handle at an acute included angle of about 45, thereby allowing the user to grasp and manipulate the shovel without having to bend the wrist or overly exert the wrist muscles of the leveraging arm. This segment provides an important, comfortable grip during angled lifting of the tool handle.

One possible embodiment of the invention is shown in FIG. 8A. The leveraging grip comprises a substantially u-shaped bar 92 comprising a first segment 94, a second segment 96, a third or gripping segment 98 and a fourth segment 100. The first and second segments are joined to form an included angle of approximately 90, whereas the second and third, as well as the third and fourth segments are joined to form an included angle of substantially 135. As will be appreciated from an examination of the figures, third segment 98 provides a convenient grip for one of the two hands used by the user to manipulate the shovel.

The leveraging grip 90 can also be provided with adjustment means 91 and 93 for adjusting the length of the first segment 94 and the fourth segment 100. The adjustment means 91 and 93 can be variously accomplished by known means. As shown in FIG. 8D–G, adjustment means comprises telescoping rods 95 and 97 attached to and extending from the shovel handle. Rods 95 and 97 are configured to slide snugly within the ends of the first segment 94 and the fourth segment 100. Both rods 95 and 97 and the ends of the first segment 94 and the fourth segment 100 are provided with pairs of holes 99 and 99' through which a pin 101 or other securing means may be passed and locked. In this way, the substantially u-shaped bar 92 may be extended away from the tool handle by sliding the bar upward along the telescoping rods and thereafter locking the bar 92 in place on the rods by means of the locking pin 101. It will be appreciated that the purpose of the adjustment means is to allow the leveraging grip to be customized to compliment the arm length and overall height of the user, thereby maximizing the leveraging power of the grip by permitting the user to maintain a substantially upright posture during use of the shovel.

The leveraging grip 90 is attached to the shovel via a clamping means 102 similar to that described for the leverage enhancing assembly described above. The clamping means 102 comprises a circular loop 104 which can be loosened or tightened using a clamping screw 106 to accommodate virtually any size of shovel handle to accommodate virtually any diameter of shovel handle. Further, the interior surface of the circular loop can be textured as described above to provide for stronger frictional contact with the shovel handle, as can be appreciated by reference to FIG. 8C, wherein the textured surface 107 is depicted.

Operation of a shovel equipped with the leveraging grip 90 can be appreciated by reference to FIG. 9, wherein a user's stooped posture is exhibited with a standard shovel as contrasted with a shovel incorporating the present invention, wherein the user's posture is substantially erect. One skilled in the art will note that the present leveraging device achieves many of the same advantages as already described for the leverage enhancing assembly 20. In particular, stress and strain on the joint, ligaments and muscles of the neck shoulders and back are greatly reduced, whereas maneuverability and efficiency of operation of the shovel is increased.

Leveraging Assembly for Hand Tools

Figure 10A:
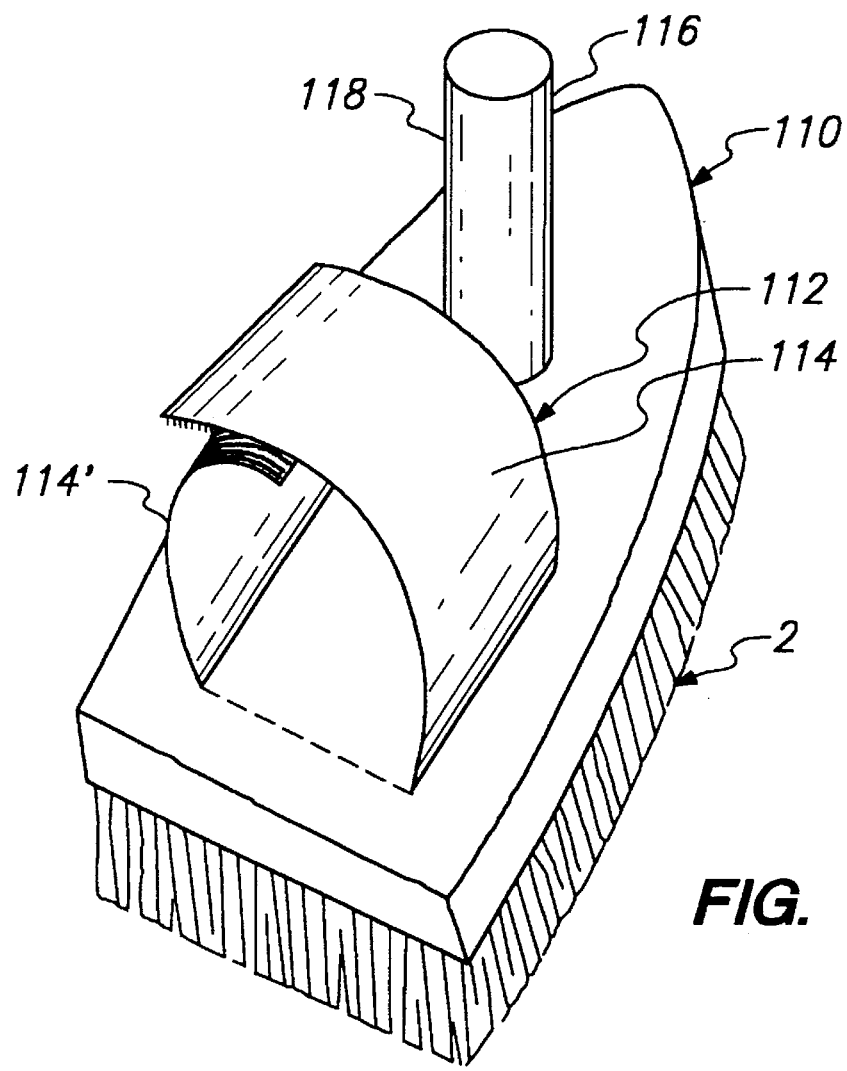
FIG. 10A is a view in perspective of a first embodiment of the leveraging assembly of the invention in conjunction with a hand brush.
Figure 10B:
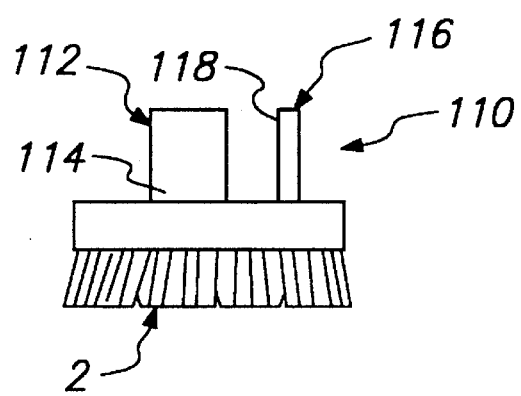
FIG. 10B is a side view of the embodiment shown in FIG. 10A.
Figure 10C:
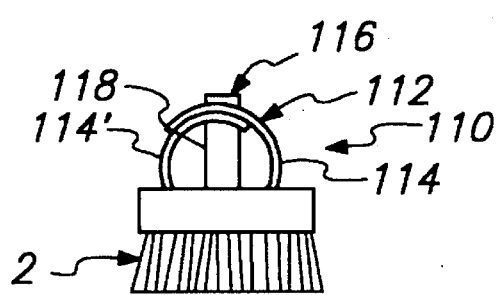
FIG. 10C is a back view of the embodiment shown in FIG. 10A.

Finally, with reference to FIGS. 10–12, a leveraging assembly 110 for a tool 2, particularly a hand tool, such as a hand brush, trowel, sanding block or the like requiring repetitive motion and resulting in strain to the wrist and hand muscles and joints, will now be described. This leveraging assembly transfers stress from small hand and wrist muscles to the larger muscle groups of the arm, shoulder, and torso. In this manner, the assembly alleviates the user's strain and fatigue to small muscles, thereby providing the user with greater comfort and enhanced endurance for performance of the task in which the tool is employed. In basic plan, the assembly in its elements is more or less analogous to that described for the leverage enhancing apparatus 20. The assembly for the hand tool is provided with a wrist securing means 112 having a pair of straps 114 and 114' that wrap around and secure a portion of the user's wrist by means of any of the fastening systems described above. The assembly is also provided with a grasping means 116 having a grasping shaft 118, as shown in FIG. 10.

Figure 11A:
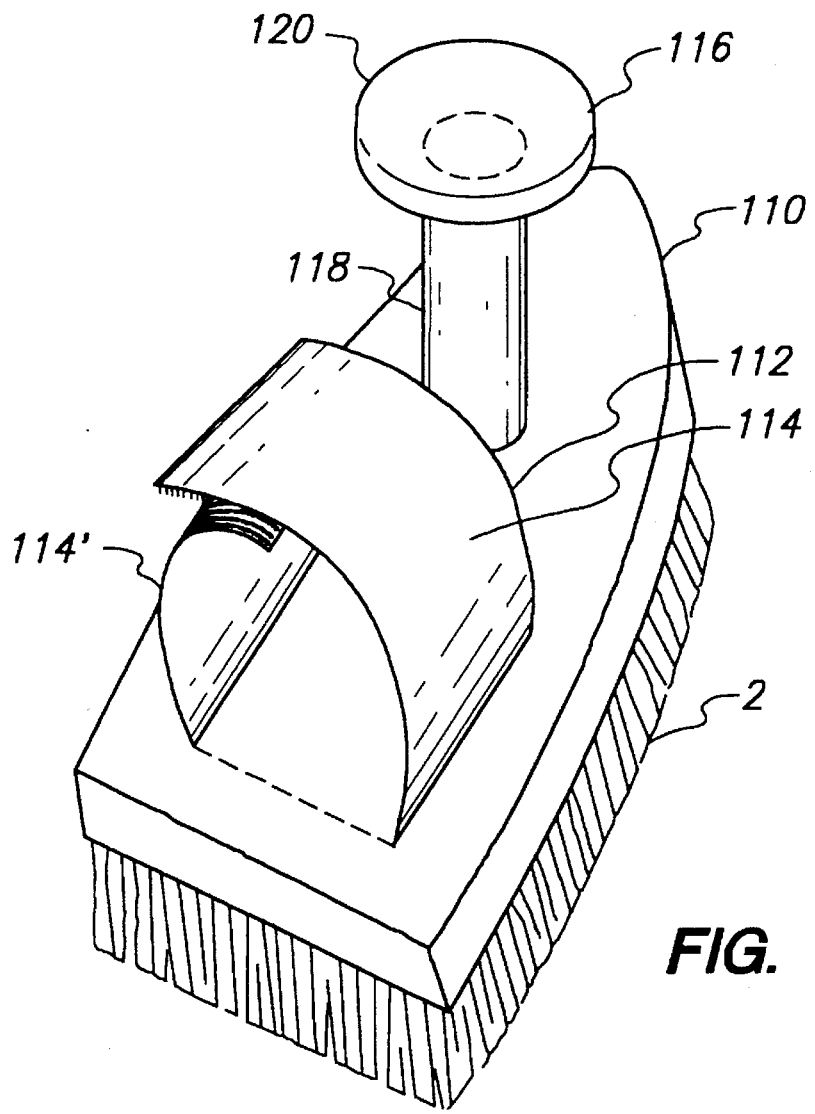
FIG. 11A is a view in perspective of a first embodiment of the leveraging assembly of the invention in conjunction with a hand brush.
Figure 11B:
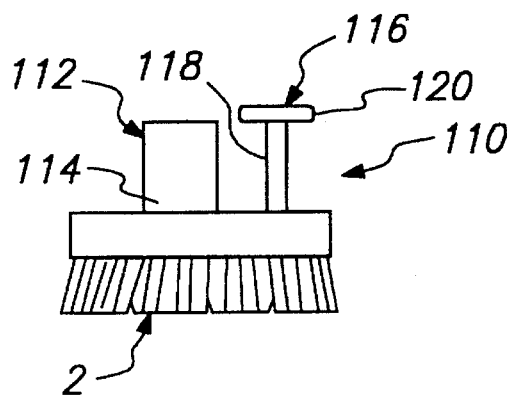
FIG. 11B is a side view of the embodiment shown in FIG. 11A.
Figure 11C:
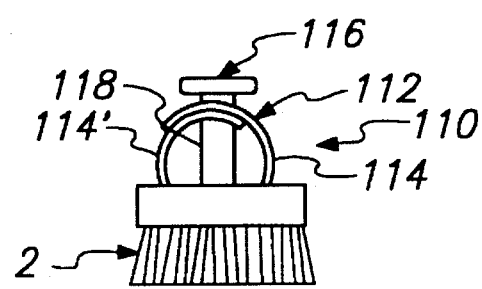
FIG. 11C is a front view of the embodiment shown in FIG. 11A.

In an alternative embodiment, shown in FIG. 11, the grasping shaft 118 is further provided with an abutment flange 120. The abutment flange 120 further increases control and reduces muscle tension by allowing the user to employ a weaker grip during tool operation without increased risk of loosing hold of the grasping shaft 118.

It will be appreciated that a sanding block or stripper could be substituted for the hand brush tool in the embodiment first described, as shown in FIG. 11D.

In yet another embodiment, shown in FIG. 12, a leveraging assembly 130 for use with a hand trowel 4 or similarly handled tool will now be described. The leveraging assembly 130 comprises an adjustable wrist securing means 132 and a grasping means 134. The wrist securing means 132 is further comprised of a pair of flexible straps 136 and 136' which can be adjusted to accommodate the dimensions of the user's wrist. Grasping means 134 comprises a grasping shaft 138 which is provided with an abutment flange 140. The abutment flange 140 further increases control and reduces muscle tension by allowing the user to employ a weaker grip during tool operation without increased risk of losing control of the grasp shaft 138. Leveraging assembly 130 is further provided with and affixed to the tool handle by clamp means 144 and 150. Said clamping means comprises a first clamp means 144 affixed to the end of the tool handle 4 proximate to the user. The clamp means 144 comprises a more or less circular loop 146 joined by a clamping screw 148. As the screw 148 is loosened, the circumference of the loop 146 is increased. Conversely, as the screw 148 is tightened, the circumference of the loop is shortened. In this way, the loop can be made to mate with and securing affix to the handle of any existing tool. In practice, the handle diameters of such tools range between ½ and 1½ inches in diameter, although it will be appreciated that the clamping means described herein could be utilized to clamp the leverage enhancing means to a handle of virtually any diameter. The clamp means 144 is generally positioned opposite the wrist restraining means 132. A further clamp means 150 may be further affixed to the distal end of said leveraging assembly as shown in FIG. 12. This additional clamping means increases the stability of the attachment of the leveraging assembly, preventing the assembly from arching or bowing away from the tool handle under stress. Said second clamp is shown having a corresponding loop 152 and clamping screw 154.

In operation the device is coupled to the wrist and hand of the user analogous to the coupling of the leverage enhancing assembly to the forearm of the user, except that given the more or less standard hand size of adults, the positioning of the wrist securing means 112 is not necessarily made adjustable relative to the grasping means 116.

As will be apparent to one skilled in the art, the assembly 110 may be made integral to the hand tool, or made be provided as an injection molded plastic platform that can be secured to the back or handle of the hand tool.

Although the invention has been just described with reference to certain physical embodiments, it will be understood that these embodiments are intended as illustrative examples only, and thus that various modifications and changes are possible with respect to these embodiments that nevertheless fall within the spirit and scope of the invention as claimed below.

I claim:

1. A leveraging assembly for attachment to an elongate handle of a mop, broom, rake, or similar tool, said levaraging assembly comprising:

a. means for securing the tool handle to a forearm of the user comprising:
   i) a first rigid longitudinal segment having a proximal end and a distal end relative to the user, said first longitudinal segment adjustably attached to a portion of the tool handle proximate to the user; and
   ii) a pair of flexible, adjustably interlocking straps extending from the proximal end of said first longitudinal segment for receiving and securing a portion of the user's forearm: and
b. means for grasping the tool handle comprising:
   i) a second rigid longitudinal segment having a proximal end and a distal end relative to the user, said second longitudinal segment adjustably attached to a portion of the tool handle opposite the user relative to said forearm securing means and in axial alignment with said forearm securing means; and
   ii) a grasping shaft extending from the distal end of said second longitudinal segment, said grasping shaft projecting substantially perpendicularly relative to the second longitudinal segment and the tool handle.

2. The leveraging assembly of claim 1 wherein said first longitudinal segment of said forearm securing means adjustably couples with said second longitudinal segment of said grasping means.

3. The leveraging assembly of claim 2 wherein said first and second longitudinal segments are each provided with clamp means for adjustably attaching said segments to the tool handle.

4. The leveraging assembly of claim 3 wherein each longitudinal segment is axially convexly configured, each segment being substantially similar in arc to that of the other segment.

5. The leveraging assembly of claim 3 wherein each of said clamp means comprises a clamp provided with an inner surface for frictional contact with the tool handle, said inner surface of said clamp further provided with a serrated surface for increasing the gripping action of the clamp on the tool handle.

6. The leveraging assembly of claim 3 wherein said first and second longitudinal segments are of substantially the same length.

7. The leveraging assembly of claim 1, wherein said grasping shaft is apically flared to provide an abutment flange for increasing the stability of the user's grip on said grasping shaft.

8. The leveraging assembly of claim 7 Wherein said abutment flange projects outward substantially perpendicular of said grasping shaft and substantially parallel to said second longitudinal segment.

9. The leveraging assembly of claim 1 wherein said leveraging assembly is further provided with a clamping means for securing said leveraging assembly to the elongate handle, said clamping means comprising a first clamp coupled to the proximal end of the first longitudinal segment substantially beneath the forearm securing means and second and third clamps coupled to the distal end of the second longitudinal segment substantially beneath and to either side of the grasping shaft.

10. The leveraging assembly of claim 1 wherein said assembly is composed of light-weight, injection-molded polymer plastic.

11. A full motion leverage enhancing assembly for attachment to an elongate handle of a mop, broom, rake, or similar tool, said levarage enhancing assembly having a first end proximal to the user and a second end distal to the user and further comprising:

a. forearm securing means located at the proximal end of said leverage enhancing assembly for securing the tool handle to a single arm of the user, said forearm securing means comprising a pair of flexible, adjustably interlocking straps that form a releasable and substantially circular clasp for receiving and securing a portion of the user's forearm;
b. means located substantially at the distal end of said leverage enhancing assembly for grasping the tool handle, said grasping means comprising a grasping shaft projecting substantially perpendicularly to the too handle; and
c. means for securing said leverage enhancing assembly to the tool handle, said securing means comprising a first clamp extending from the proximal end of said leverage enhancing assembly substantially beneath the forearm securing means and second and third clamps extending from said leverage enhancing assembly substantially beneath and on either side of the grasping shaft, whereby the combination of the first, second, and third clamps enhance the stability of the attachment of said assembly to the tool handle.

12. A full motion leveraging assembly for attachment to an elongate handle of a mop, broom, rake, or similar tool, said leveraging assembly comprising:

a. means for securing the tool handle to a single arm of the user comprising:
   i) a first rigid longitudinal segment having a proximal end and a distal end relative to the user, said first longitudinal segment adjustably attached to a portion of the tool handle proximate to the user by means of a first semi-rigid clamp having an adjustable circumference means; and
   ii) a pair of flexible, adjustably interlocking straps extending from the proximal end of said longitudinal segment opposite the clamp relative to the tool handle, said straps being adjustable and forming a releasable, and substantially circular clasp for receiving and securing a portion of the user's forearm; and
b. means for grasping the tool handle comprising:
   i) a second rigid longitudinal segment having a proximal end and a distal end relative to the user, said second longitudinal segment adjustably attached at its distal end to a portion of the tool handle by means of second and third semi-rigid clamps having an adjustable cicumference means, said second longitudinal segment in axial alignment with and are adjustably matable to said first longitudinal segment; and
   ii) a grasping shaft extending substantially perpendicularly from the distal end of said second longitudinal segment substantially opposite and between the second and third clamps on said second longitudinal segment, said grasping shaft further provided with an abutment flange for increasing the stability of the user's grip on said grasping shaft.

13. The leveraging assembly of claim 12 wherein said abutment flange projects outward substantially perpendicular to said grasping shaft and substantially parallel to said second longitudinal segment.

14. The leveraging assembly of claim 12 wherein each longitudinal segment is axially convexly configured, each segment being substantially similar in arc to that of the other segment.

15. The leveraging assembly of claim 14 wherein each of said clamps are provided with an inner surface for frictional contact with the tool handle, said inner surface of said clamp further provided with a serrated surface for increasing the gripping action of the clamp on the tool handle.

16. The leveraging assembly of claim 14 wherein said first and second longitudinal segments are of substantially the same length.

17. The leveraging assembly of claim 12 wherein said arm securing means is provided with a hole and peg system for adjustable mating, said hole and peg system comprising a series of holes provided lengthwise along one of said straps and a peg provided lengthwise along the other of said straps, said peg configured to snugly mate with said holes.

18. The leveraging assembly of claim 12 wherein said pair of straps of said arm securing means is provided with a hook and loop Velcro® fastening system.

* * * * *